VOLKMANN & MILLER.
Carriage Axle.
No. 88,240.  Patented March 23, 1869.
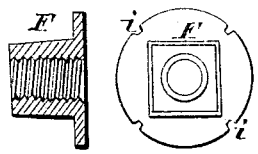
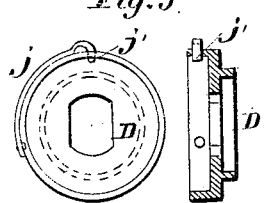
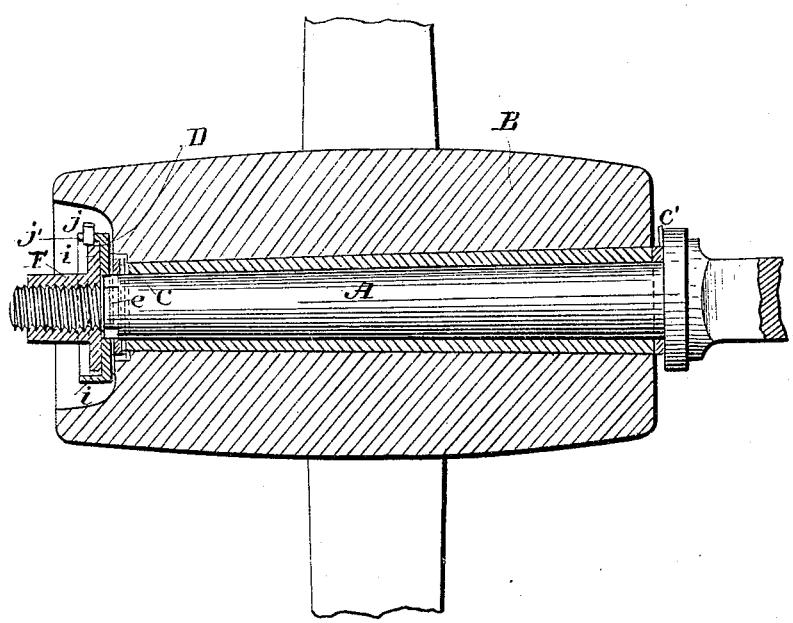
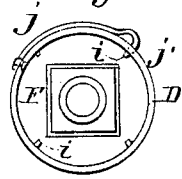
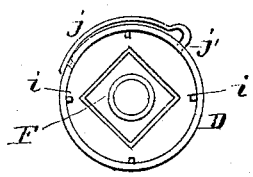
Witnesses:
Theodore Bergner
Henry Stuart
Inventors:
Frederick Volkmann
Augustus Miller

FREDERICK VOLKMANN AND AUGUSTUS MILLER, OF PHILADELPHIA, PENNSYLVANIA.

Letters Patent No. 88,240, dated March 23, 1869.

IMPROVEMENT IN CARRIAGE-AXLES.

The Schedule referred to in these Letters Patent and making part of the same

*To all whom it may concern:*

Be it known that we, FREDERICK VOLKMANN and AUGUSTUS MILLER, of the city of Philadelphia, and State of Pennsylvania, have invented a new and useful Improvement in Axles for Vehicles; and we do hereby declare the following to be a full and exact description thereof, reference being had to the accompanying drawing, and to the figures and letters of reference marked thereon.

The nature of our invention consists in providing a very efficient and simple means of securely locking the nut which holds the wheel in place upon the axle, so that the nut cannot be unscrewed and lost by the friction of the wheel in backing.

This is a frequent occurrence with inefficient locking of the nut, and has often been the cause of serious accidents and loss of life.

Our invention consists in locking the nut in the required position, by a spring-latch, attached to the rim of a washer, which is placed between the nut and the hub of the wheel.

The nut has a round flange, with a series of notches cut in its circumference, into any one of which the locking-hook of the spring-latch may be dropped.

The washer which carries the latch is effectually prevented from turning on the axle to which it is fitted, and thus it follows that the nut, when locked in turn to this washer, as described, is securely held from undue turning or unscrewing.

In order that our invention may be fully understood, we will now proceed more particularly to describe its construction and operation.

On reference to the drawing making part of this specification, and in which similar letters of reference allude to like parts throughout the several views—

Figure 1 is a side view of an axle-bearing, representing, in section, the hub of a wheel upon an axle containing our improvement.

Figure 2 is an end view of the nut and washer, with the locking-spring in place, to keep the nut from turning.

Figure 3 is a similar view of the same parts, but showing the spring-latch lifted out, for unscrewing the nut.

Figures 4 and 5 are detached views of the flanged nut, and of the washer carrying the locking-spring.

The axle A is of the ordinary construction, having a tapered bearing for the hub B of the wheel, and a fixed collar on the inner end of the hub.

Leather washers $c\ c'$ are provided, as usual, at both ends of the bearing, the outer one of these, $c$, being confined in a suitable recess in the flanged washer D.

This washer is fitted to a part, $e$, of the axle having two flattened sides, to prevent the washer from turning.

F is the nut fitting the threaded end of the axle. It has a circular flange, into which is cut a series of notches, $i\ i$.

The edge of this notched flange is surrounded by an annular rim, projecting outward from the washer D, and carrying on its circumferential surface the locking-spring $j$. The locking-hook $j'$ of this spring passes inward, through a suitable opening in the rim of the washer, and tends to enter any of the notches in the flange of nut F, as the latter is turned within the rim of the washer.

By inserting the blade of a knife, or any suitable instrument between the spring $j$ and the outside of washer D, the locking-hook $j'$ is withdrawn from its hold upon the nut, and the latter may be unscrewed.

An important advantage which our improved locking-arrangement has over many of the devices heretofore contrived for this purpose, consists in the fact that its action and reliability are not confined to a particular position of the nut upon the axle, on which its position may vary in an endwise direction, to adapt itself to varying thicknesses of leather washers, taking care only to keep the washer D upon the flattened part of the axle, which prevents it from turning.

This important feature of our improvement is lost in all locking-arrangements depending on split collars let into the axle, or in those having pins passing transversely through the axle, whereby endwise variation upon the axle is prevented.

It will also be found an evident advantage of our improvement, that it may readily be applied to old axles of the ordinary construction, it being only required to put, in place of the common leather washer, our improved metallic flanged washer, and to keep this washer from turning upon the axle.

Having thus fully described the construction and advantages of our improvement,

What we claim as our invention, and desire to secure by Letters Patent, is—

The metallic washer D, flanged nut F, and notches $i\ i$, in combination with a locking-spring, $j$, the whole relatively arranged, and operating as and for the purpose described.

FREDERICK VOLKMANN.
AUGUSTUS MILLER.

Witnesses:
W. W. DOUGHERTY,
LAWRENCE TOBIN.